United States Patent [19]

Sato et al.

[11] Patent Number: 4,745,581
[45] Date of Patent: May 17, 1988

[54] LSI SYSTEM OF A STRUCTURE REQUIRING NO ADDITIONAL ADDRESS SIGNALS TO INCORPORATE ADDITIONAL STATUS REGISTERS INTO THE SYSTEM

[75] Inventors: Tomoru Sato, Kodaira; Kenji Kaneko, Sagamihara; Hirotada Ueda, Kokubunji; Yoshimune Hagiwara, Hachioji; Hitoshi Matsushima, Tachikawa; Tetsuya Nakagawa, Kokubunji; Atsushi Kiuchi, Kunitachi, all of Japan

[73] Assignee: Hitachi, Ltd., Tokyo, Japan

[21] Appl. No.: 855,928

[22] Filed: Apr. 25, 1986

[30] Foreign Application Priority Data

Apr. 26, 1985 [JP] Japan .................................. 60-88535

[51] Int. Cl.$^4$ ...................... G11C 13/00; G11C 11/40
[52] U.S. Cl. ..................................... 365/189; 365/230
[58] Field of Search ............... 365/189, 190, 201, 230, 365/206, 207, 208

[56] References Cited

U.S. PATENT DOCUMENTS

| | | | |
|---|---|---|---|
| 3,868,642 | 2/1975 | Sachs | 365/49 |
| 4,219,883 | 8/1980 | Kobayashi et al. | 365/49 |
| 4,653,050 | 3/1987 | Vaillancourt | 365/200 |

*Primary Examiner*—Terrell W. Fears
*Attorney, Agent, or Firm*—Antonelli, Terry & Wands

[57] ABSTRACT

An LSI system is disclosed in which a plurality of status registers for indicating the internal status of the system are connected to each other so as to form a hierarchical structure and the contents of each of the remaining status registers other than one status register can be transferred to an output register through a bus, to make it possible to provide additional status registers in the system without increasing the number of address signals used and the number of pins connected to external address signal lines.

3 Claims, 2 Drawing Sheets

LSI SYSTEM OF A STRUCTURE REQUIRING NO ADDITIONAL ADDRESS SIGNALS TO INCORPORATE ADDITIONAL STATUS REGISTERS INTO THE SYSTEM

BACKGROUND OF THE INVENTION

The present invention relates to a system formed of a large scale integration circuit (hereinafter referred to as "LSI system"), and more particularly to an LSI system which can read out detailed information on the internal status of the system without requiring any additional address signal.

An LSI system such as a microcomputer is often provided with status registers which store information reflecting various kinds of internal status of the system such as error information indispensable for program debugging or system debugging. In this case, respective outputs of the status registers may be multiplexed, as shown in FIG. 1.

FIG. 1 shows a first example of conventional LSI systems which is described, for example, on pages 378 and 379 of HITACHI MICROCOMPUTER DATA BOOK. As shown in FIG. 1, this first example includes status registers 11 and 12, a selector 15, an output buffer 16, and various kinds of registers 10, 13 and 14. In the first example, ordinary information on the internal status of the system is stored in the status register 11 (that is, a status register—A), and error information is stored in the status register 12 (that is, status register—B). The outputs of the status registers 11 and 12 are multiplexed together with the outputs of the registers 10, 13 and 14, and a desired one of these outputs is selected by a corresponding one of address signals AD. Accordingly, when an additional status register is provided in the system, an additional address signal is required for specifying the additional status register.

FIG. 2 shows a second example of conventional LSI systems which is described, for example, on pages 582 and 583 of HITACHI MICROCOMPUTER DATA BOOK. As shown in FIG. 2, the second example includes a status register (SR) 21, an error status register (ESR) 22, various kinds of registers 20, 23 and 24, a selector 25, an output buffer 26, and an OR circuit 27. In this second example, ordinary information on the internal status of the system is stored in the status register 21, and various error information is stored in the error status register 22. All the bits of the register 22 are connected to the input side of the OR circuit 27, the output side of which is connected to one bit of the status register 21. Thus, the contents of the error status register 22 are reflected on one bit of the status register 21. The outputs of the status register 21 and the error status register 22 are multiplexed together with the outputs of the registers 20, 23 and 24, and a desired one of these outputs is selected by a corresponding one of address signals AD. Accordingly, the presence of an error in the system can be detected by monitoring the status register 21, and detailed error information can be obtained in such a manner that the contents of the error status register 22 are selectively read out by an address signal. Similarly to the first example, the second example has the following drawbacks. That is, when an additional status register is provided in the system, an additional address signal is required for specifying the additional status register, and thus the number of pins connected to external address signal lines is increased.

As an LSI system becomes larger in scale and more multi-functional, it is necessary to monitor as much information on the internal status of the LSI system as possible, thereby keeping short a time necessary for system debugging. Accordingly, there arises a serious problem that external address signal lines corresponding to status registers which are provided in the system, have to be connected to the LSI system.

SUMMARY OF THE INVENTION

A main object of the present invention is to provide an LSI system which can monitor detailed information on the internal status of the LSI system and various error information, using a limited number of address signals and connecting pins, and thus can readily carry out system debugging.

In order to attain the above object, according to the present invention, there is provided an LSI system in which status registers for indicating the internal status of the LSI system are connected to each other so as to form a hierarchical structure and the contents of each of the remaining status registers other than one status register can be transferred to an output register through a bus, to make it possible to incorporate additional status registers into the LSI system without increasing the number of address signals used and the number of pins connected to external address signal lines.

DESCRIPTION OF THE PREFERRED EMBODIMENTS

The present invention will be explained below, on the basis of embodiments thereof.

Figure 3:
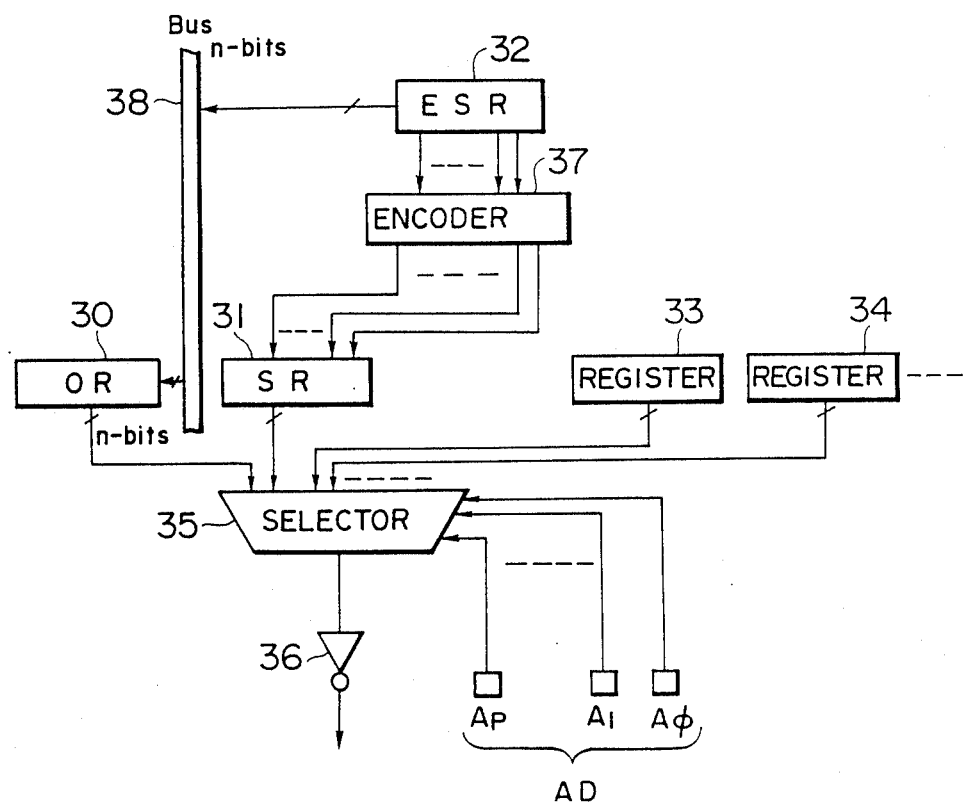
FIG. 3 is a block diagram showing an embodiment of an LSI system according to the present invention.

FIG. 3 shows a first embodiment of an LSI system according to the present invention. As shown in FIG. 3, the first embodiment includes a status register (SR) 31 for indicating the internal status of the system, an error status register (ESR) 32, an output register (OR) 30, various kinds of registers 33 and 34, a selector 35, an output buffer 36, and an encoder 37. Of various kinds of information on the internal status of the system, error information necessary for stopping the operation of the system and necessary for program debugging and system debugging, is stored in the error status register 32. The error information is classified and encoded by the encoder 37, and then information reflecting the error information is stored in the status register 31 together with ordinary information on the internal status of the system. For example, error information given by n bits of the error status register 32 is compressed into m bits (where $n > m$), and is then stored in the status register 31. Such compression of information can be made by appropriately combining AND operations and OR operations.

As can be seen from the above, the operating state of the system and an abstract of errors in the system can be roughly determined by monitoring the status register 31, and detailed error information is stored in the error status register 32. The error status register 32 is connected to the output register 30 through the bus 38. The error information stored in the error status register 32 is transferred to the output register 30 in response to an external command, and then read out. The transfer of data based upon an external command is carried out in an ordinary manner. According to the above circuit configuration, another error status register can be provided in addition to the error status register 32, without requiring any additional address signal. That is, a plurality of error status registers can be provided in the system without increasing the number of pins ($A_p, \ldots, A_1, A_\phi$) connected to external address signal lines AD.

Figure 1:
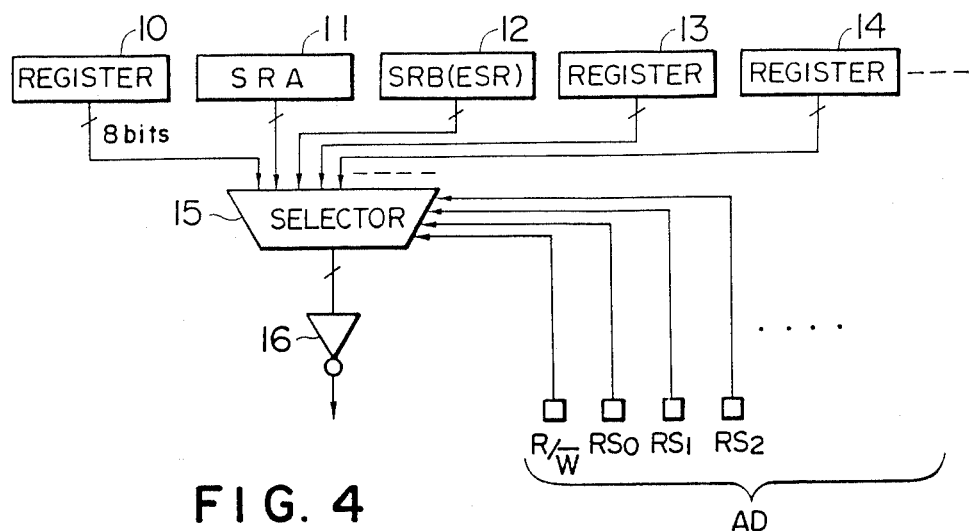
FIGS. 1 and 2 are block diagrams showing conventional LSI systems.
Figure 4:
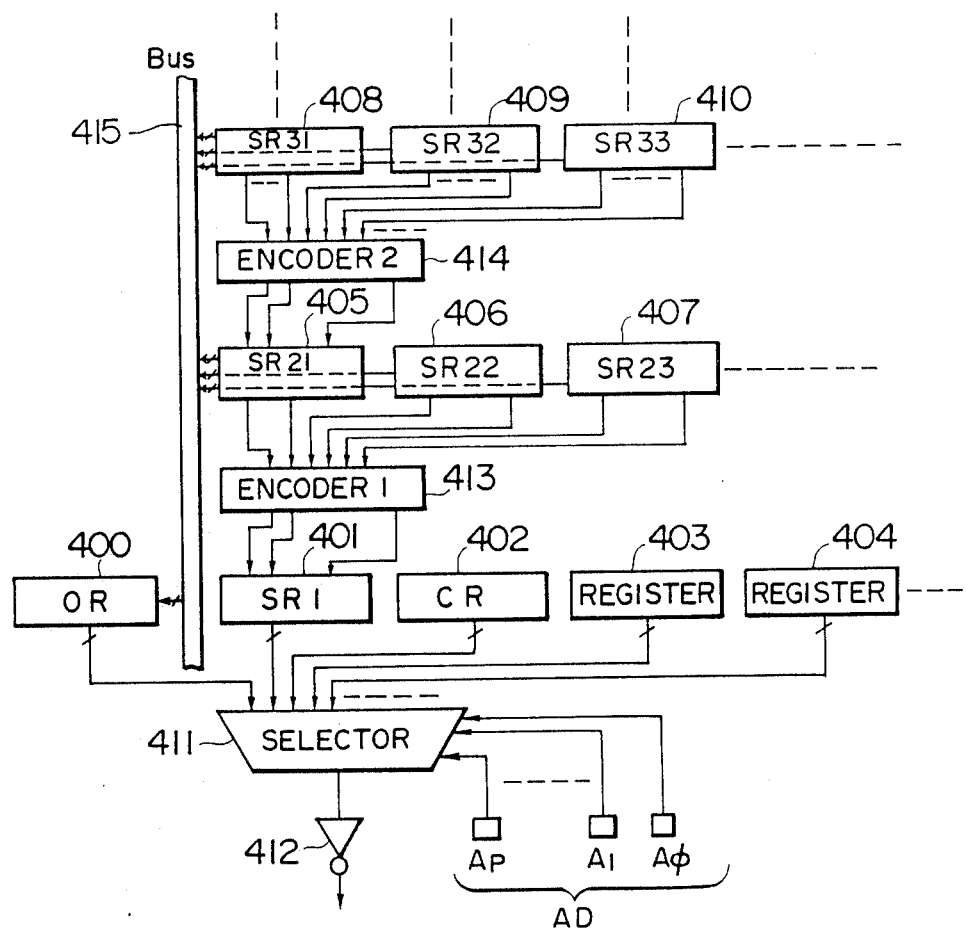
FIG. 4 is a block diagram showing another embodiment of an LSI system according to the present invention.
Figure 2:
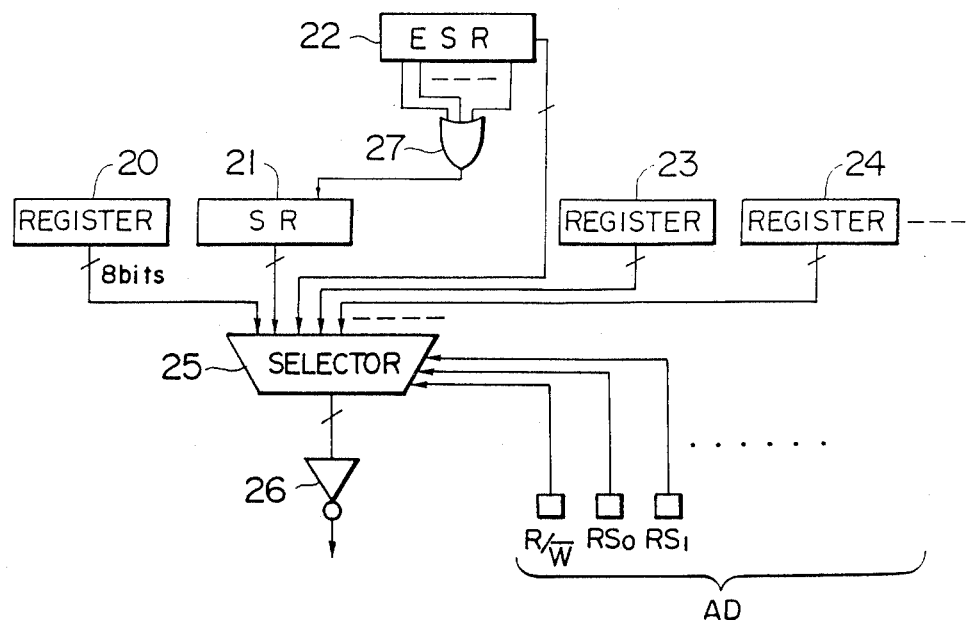

FIG. 4 shows a second embodiment of an LSI system according to the present invention. The second embodiment is an expanded version of the first embodiment shown in FIG. 3. Referring to FIG. 4, a status register 401, a status register group including status registers 405, 406 and 407, and another status register group including status registers 408, 409 and 410 are connected in parallel through encoders 413 and 414 so as to form a hierarchical structure, and each of the status registers 405 to 410 is connected to an output register 400 through a bus 415. As can be seen from FIG. 4, the internal status of the system can be roughly determined by monitoring the status register 401, and detailed information on the internal status of the system can be obtained in such a manner that the contents of the status registers 405 to 410 are successively transferred to the output register 400 in accordance with external commands, and then read out. An example for one of the status registers 405 to 410 whose contents is to be transferred to the output register 400, is specified in the following manner. Respective addresses of the status registers 405 to 410 are previously set in a control register 402, and one of the status registers 405 to 410 is specified in accordance with an external command for transferring desired data to the output register 400, by utilizing the contents of the control register 402. The transfer of data from each of the status registers 405 to 410 to the output register 400 is carried out in an ordinary manner. Incidentally, in FIG. 4, reference numerals 403 and 404 designate various kinds of registers, reference symbols $A_p$, $A_1$ and $A_\phi$ connecting pins, reference character AD external address signal lines, and reference numerals 411 and 412 a selector and an output buffer.

According to the circuit configuration shown in FIG. 4, the internal status of each of LSI systems having a wide variety of structures can be monitored in detail without increasing the number of address signals and the number of pins connected to external address signal lines.

As has been explained in the foregoing, according to the present invention, the internal status of an LSI system can be monitored in detail without necessitating any additional address signal. That is, a large number of status registers can be provided in the system without increasing the number of pins connected to external address signal lines. Accordingly, the present invention is advantageous over prior art systems.

Further, according to the present invention, a large amount and a wide variety of information on the internal status of an LSI system can be readily obtained, and hence the length of time necessary for program debugging or system debugging can be shortened.

What is claimed is:

1. An LSI system comprising:
   first register means for storing first internal status information of said LSI system;
   second register means for storing second internal status information of said LSI system as a predetermined number of bits;
   output register means coupled to said second register means through a bus means, for storing said second internal status information;
   selector means for transmitting the internal status information stored in one of said first register means and said output register means to an output buffer in response to an address signal; and
   encoder means for compressing the predetermined number of bits of said second internal status information stored in said second register means and for transmitting the compressed bit information to said first register means.

2. An LSI system according to claim 1, wherein said first register means and said second register means are connected to each other through said encoder means so as to form a hierarchical structure.

3. An LSI system according to claim 2, wherein said first and second register means are status registers and said LSI system is a microcomputer.

* * * * *